United States Patent [19]
Sato

[11] 4,034,305
[45] July 5, 1977

[54] DEMODULATOR FOR SIGNALS HYBRID MODULATED BY MORE AND LESS SIGNIFICANT DIGIT SIGNALS IN SUCCESSION IN EACH CLOCK INTERVAL

[75] Inventor: Yoichi Sato, Tokyo, Japan

[73] Assignee: Nippon Electric Company, Ltd., Tokyo, Japan

[22] Filed: Apr. 5, 1976

[21] Appl. No.: 673,910

Related U.S. Application Data

[62] Division of Ser. No. 500,905, Aug. 27, 1974, Pat. No. 3,980,971.

[30] Foreign Application Priority Data

Sept. 5, 1973 Japan ............... 48-99933

[52] U.S. Cl. ............................ 329/50; 325/330; 329/105; 329/145
[51] Int. Cl.² ............................... H03D 1/00
[58] Field of Search ............ 329/50, 104, 105, 122, 329/124, 145; 325/330, 331

[56] References Cited
UNITED STATES PATENTS 3,646,252  2/1972  Verstraelen et al. ............ 329/50 X
3,654,564  4/1972  Tisi et al. ........................ 329/50 X Primary Examiner—Siegfried H. Grimm
Attorney, Agent, or Firm—Ostrolenk, Faber, Gerb & Soffen

[57] ABSTRACT

A demodulator for demodulating a received quadrature amplitude modulated signal includes a generator for generating a local carrier signal, a synchronous detector responsive to the local carrier signal for deriving in phase and quadrature phase base bank components from the modulated signal, means responsive to the received signal for deriving timing pulses, a first sampler responsive to the timing pulses for producing samples of the in phase base band components, and a second sampler responsive to the timing pulses for producing samples of the quadrature phase base band components. First delay means for delaying the in phase component samples, second delay means for delaying the quadrature phase component samples, a correlation circuit responsive to the undelayed and delayed, in phase and quadrature phase, component samples for producing a correlation signal. A synchronous pulse generator responsive to the timing pulses and the correlation signal produces synchronizing pulses. A phase control circuit responsive to the synchronizing pulses and the undelayed and delayed, in phase and quadrature phase, component samples produces a control signal. The control signal is supplied to the local carrier generator to control the phase of the local carrier signal relative to the received signal.

4 Claims, 4 Drawing Figures

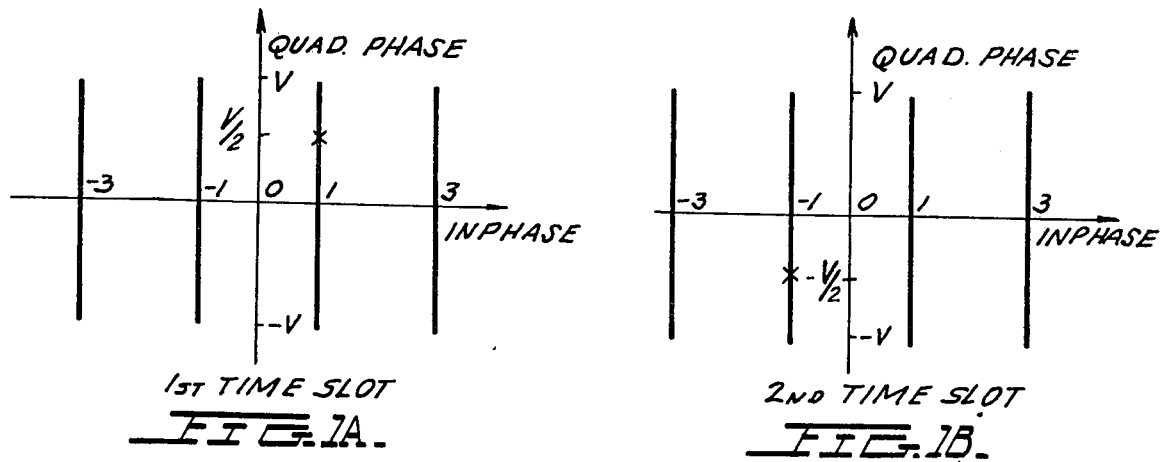
FIG. 1A. 1st TIME SLOT
FIG. 1B. 2nd TIME SLOT
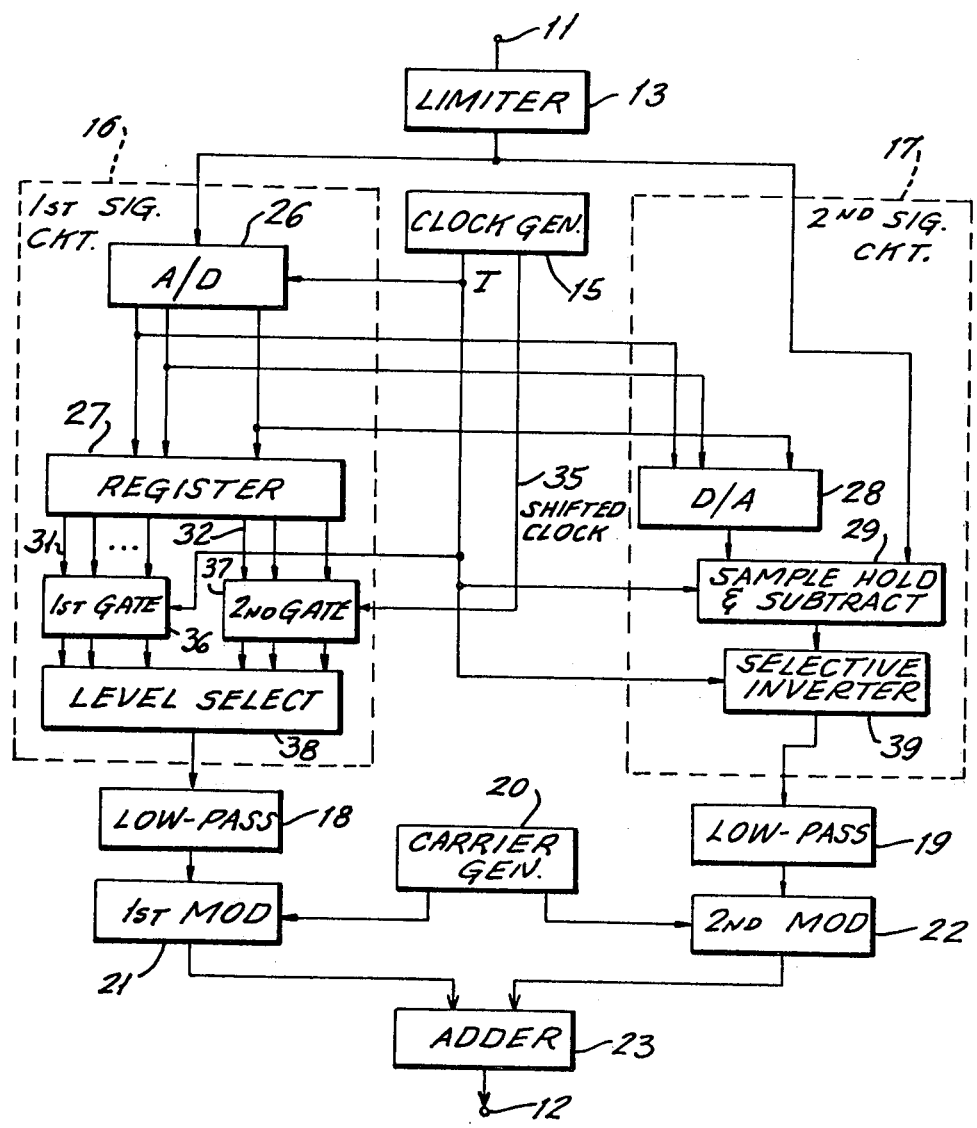
FIG. 2.

DEMODULATOR FOR SIGNALS HYBRID MODULATED BY MORE AND LESS SIGNIFICANT DIGIT SIGNALS IN SUCCESSION IN EACH CLOCK INTERVAL

This is a division of application Ser. No. 500,905 filed Aug. 27, 1974, now U.S. Pat. No. 3,980,971.

BACKGROUND OF THE INVENTION

This invention relates to a demodulator for hybrid or quadrature amplitude modulation.

In hybrid modulation, such as described by R. W. Lucky in his book entitled "Principles of Data Communication," pp. 177-178, a cosine and a sine carrier signal are amplitude modulated by a first and a second signal derived from an input signal to be transmitted. It is already known that the hybrid modulation provides from twice to four times as much transmission capacity as compared to conventional frequency modulation, as discussed by D. D. McRae in IEEE Transactions on Communications, 1971 August Issue, pp. 431-445, under the title "Performance Evaluation of a New Modulation Technique." In addition, the hybrid modulation is believed to be effective for use in satellite communications. It is, however, difficult with conventional hybrid modulation techniques to control the phase of a local carrier signal produced on a receiving side.

SUMMARY OF THE INVENTION

It is therefore an object of the present invention to provide a demodulator for demodulating a quadrature amplitude modulated signal having a predetermined clock interval. To fully understand the present invention, both a suitable modulator and demodulator are disclosed.

A modulator for quadrature amplitude modulating a carrier signal by a first and a second signal derived from an input signal includes digital signal deriving means responsive to clock pulses defining equal clock intervals from sampling and quantizing the input signal into a digital signal comprised of a plurality of digits or bits and error signal deriving means responsive to the clock pulses and the input and digital signals for deriving an error signal representative of quantization errors of the digital signal in the respective clock intervals. In accordance with this invention, the modulator comprises first means for dividing or separating the digital signal into a more significant signal comprising a predetermined number of more significant digits of the above-mentioned plurality of digits and a less significant signal comprising the remaining less significant digits, second means responsive to the clock pulses for deriving the first signal by arranging the more and less significant signals in time succession in each of the clock intervals, and third means responsive to the clock pulses for deriving the second signal by inverting the error signal in a predetermined half of the above-mentioned clock interval and by arranging the error signal and the inverted error signal in time succession in the above-mentioned each clock interval.

A demodulator for demodulating a received signal supplied from a modulator mentioned in the next preceding paragraph includes a local carrier generator for generating a local carrier signal, a synchronous detector responsive to the local carrier signal for deriving in phase and quadrature phase base band components from the received signal, means responsive to the received signal for deriving timing pulses from a repetition period equal to a half of the clock interval, a first sampler responsive to the timing pulses for producing samples of the in phase base band components, and a second sampler responsive to the timing pulses for producing samples of the quadrature phase base band components. In accordance with this invention, the demodulator comprises first delay means for delaying the in phase component samples by the repetition period, second delay means for delaying the quadrature phase component samples by the repetition period, a correlation circuit responsive to the undelayed and delayed in phase said quadrature phase component samples for producing a correlation signal representative of the correlation between each of the undelayed and delayed in phase and quadrature phase component samples and that one of the undelayed and delayed in phase and quadrature phase component samples which appears the repetition period after the above-mentioned each of undelayed and delayed in phase and quadrature phase component samples, a synchronizing pulse generator responsive to the timing pulses and the correlation signal for producing synchronizing pulses appearing in synchronism with the clock interval of the received signal, and a phase control circuit responsive to the synchronizing pulses and the underlayed and delayed in phase and quadrature phase component samples for producing a control signal. The control signal is supplied to the local carrier generator to control the phase of the local carrier signal.

BRIEF DESCRIPTION OF THE DRAWING

FIGS. 1A and 1B show a first and a second portion of a signal map exemplifying the quadrature amplitude modulation technqiue resorted to in a modulator and a counterpart demodulator according to the instant invention;

FIG. 2 is a block diagram of a modulator according to this invention; and

DESCRIPTION OF THE PREFERRED EMBODIMENTS

Figure 3:
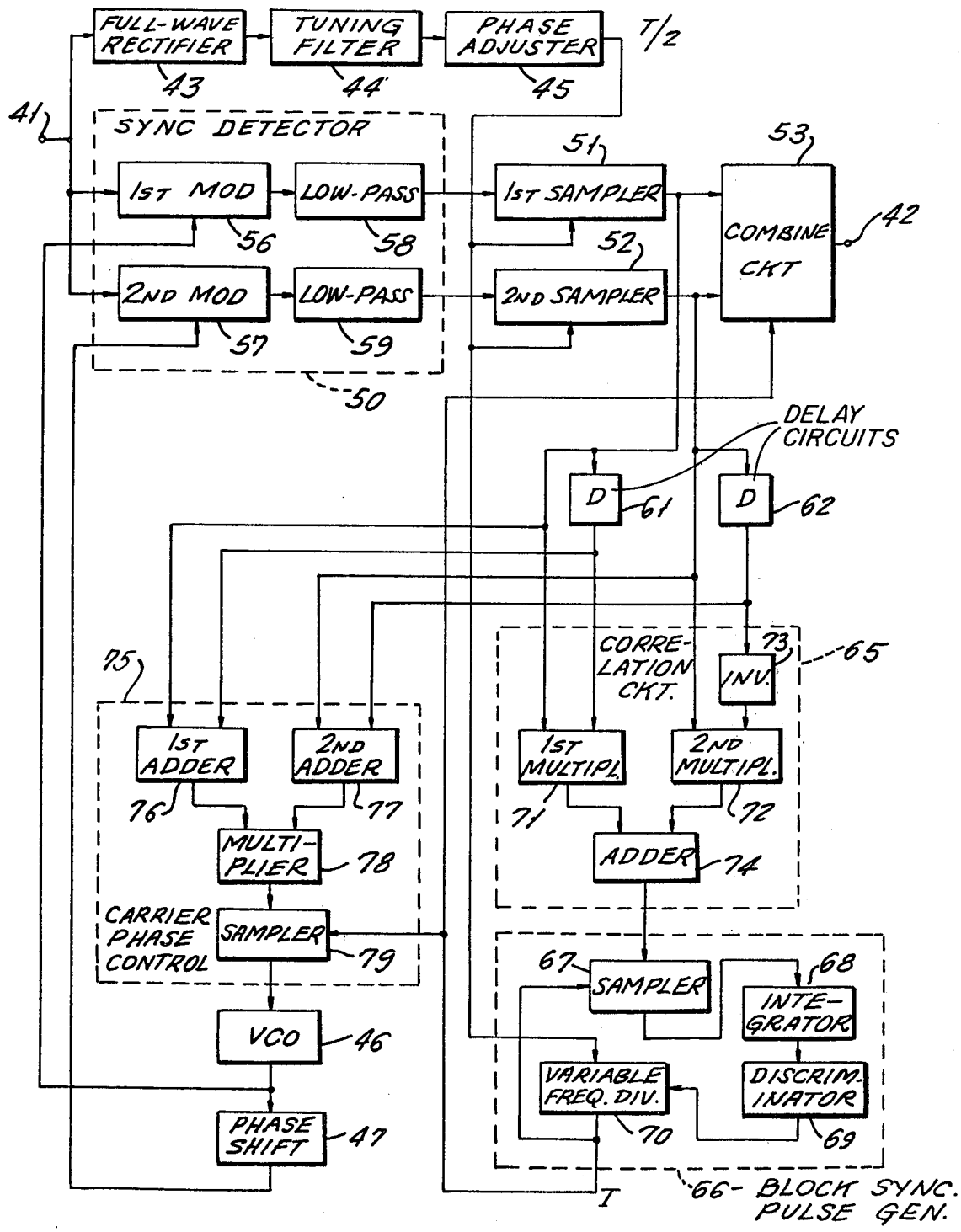
FIG. 3 is a block diagram of a demodulator according to this invention.

Referring to FIGS. 1A and 1B, principles of signal mapping resorted to in the present invention will be described at first in conjunction with a simple example. It is now presumed that an analog input signal to be transmitted is quantized into a four-bit digital signal. In accordance with this invention, the more significant two digits or bits of the digital signal are transmitted within an earlier half of each clock interval as the in phase components of a transmission or modulated signal. Four levels −3, −1, 1, and 3 are represented by code combinations 11, 10, 01, and 00, respectively, of the more significant digits. The two less significant digits are transmitted, also as in phase components of the transmission signal, within the later half of each clock interval. Four levels −3, −1, 1, and 3 may similarly be represented by code combinations 11, 10, 01, and 00 of the less significant digits. Quantization errors accompanying the digital signal are represented by analog values ranging from −V to V. An error signal representative of a quantization error $y$ and an inverted quantization error $-y$ is transmitted as quadrature phase components of the transmission signal in the earlier and later halves of each clock interval. For example, points designated with crosses in FIGS. 1A and 1B represent an input signal respectively given by a more significant signal of 01, of less significant signal of 10, and a quantization error of (+)V/2 and (−)V/2.

In a more generalized form, principles of the signal mapping may be given as follows. Responsive to clock pulses defining clock intervals of a duration of T seconds, an input signal is sampled and quantized into a digital signal of B digits or bits in the respective clock intervals. These B bits are divided (i.e. separated) into a predetermined number $b1$ of more significant digits and the remaining less significant digits of a number $b2$ equal to B minus $b1$. A value represented by a set of the more significant bits derived in a $k$-th clock interval is transmitted within a first time slot of the clock interval as the first in phase component $x_{k,1}$ of a transmission or modulated signal which has the relevant one of $2^{b1}$ levels. A value represented by a set of the less significant bits derived in each clock interval is transmitted within a second time slot of the $k$-th clock interval as the second in phase component $x_{k,2}$ of the transmission signal which has a pertinent one of $2^{b2}$ levels. Responsive also to the clock pulses, quantization errors of the digital signal are derived in the respective clock intervals. A quantization error derived in the $k$-th clock interval is transmitted within one of the first and second time slots of the $k$-th clock interval as that first quadrature phase component $y_k$ of the transmission signal which is proportional to the quantization error. The quantization error is transmission within the other of the first and second time slots as a second quadrature phase component $-y_k$ that is equal in magnitude to the first quadrature phase component but with the polarity inverted.

Referring to FIG. 2, a modulator responsive to an analog input signal to be transmitted for producing a quadrature amplitude modulated signal includes an input terminal 11 for the input signal, an output terminal 12 for the modulated signal, a limiter 13 for amplitude limiting the input signal, a clock or timing pulse generator 15 of clock or timing pulses defining equal clock intervals T, first and second signal deriving circuits 16 and 17 responsive to the clock pulses and the amplitude limited input signal for producing a first and a second signal, low-pass filters 18 and 19 for the first and second signals, a carrier signal generator 20 for generating a cosine and sine carrier signal, a first ring modulator 21 for amplitude modulating the cosine carrier signal by the first signal having passed through the low-pass filter 18 to produce in phase components of the modulated signal, a second ring modulator 22 for amplitude modulating the sine carrier signal by the second signal having passed through the low-pass filter 19 to produce quadrature phase components of the modulated signal, and an adder 23 for summing up the in phase and quadrature phase components to deliver the modulated signal to the output terminal 12. The first signal deriving circuit 16 includes an analog-to-digital converter 26 responsive to the clock pulses for sampling and quantizing the amplitude limited input signal into a digital signal of a plurality of digits or bits, and a register 27 for storing the digital signal. The second signal deriving circuit 17 includes a digital-to-analog converter 28 for converting the digital signal into a local analog signal, and a sample hold and subtraction circuit 29 responsive to the clock pulses for holding samples of the amplitude limited input signal during one clock interval and for subtracting the local analog signal successively from the held samples to derive an error signal representative of quantization errors of the signal in the respective clock intervals.

In accordance with an embodiment of this invention depicted in FIG. 2, the first signal deriving circuit 16 comprises a first set of conductors 31 for a more significant signal comprising a first predetermined number of more significant digits or bits of the digital signal stored in the register 27, a second set of conductors 32 for a less significant signal comprising the remaining less significant bits of the digital signal stored in the register 27, a clock conductor 35 for clock pulses whose phase is shifted by a half of the clock interval with respect to the phase of the clock pulses produced by the generator 15, a first gate 36 responsive to the clock pulses for causing the more significant signal (i.e. more significant bits) to pass therethrough, and a second gate 37 responsive to the phase shifted clock pulses for causing the less significant signal (i.e. less significant bits) to pass therethrough, and a level selection circuit 38 responsive to the gated more and less significant signals for producing the first signal which assumes alternatingly in succession in each clock interval the levels corresponding to the values successively represented by the more and less significant signals. In accordance also with this invention, the second signal deriving circuit 17 comprises a selectively operable inverter 39 responsive to the clock pulses for deriving the second signal by causing the error signal to pass therethrough during an earlier half of each clock interval and inverting the error signal during the remaining half of the clock internal.

In the manner known in the art, a hybrid modulated signal is supplied at a receiving end to a synchronous detector and it is convenient to represent the in phase and quadrature phase components derived by the synchronous detector from the hybrid modulated signal by real and imaginary parts of complex numbers. In describing a demodulator according to this invention, it may be presumed for simplicity of description that the first and second time slots are T/2 seconds long, that the quadrature phase components $y_k$ and $-y_k$ of a $k$-th clock interval are transmitted and received in the first and second time slots of the $k$-th clock interval, respectively, and that use is made of a conventional sampler for sampling the output signal of the synchronous detector with a sampling or repetition period of T/2 seconds in synchronism with the clock intervals of the received signal. A train of the sampled values are now represented by a sequence $$\ldots, (x_{k-1,1} + jy_{k-1})e^{j\theta_{k-1,1}}, (x_{k-1,2} - jy_{k-1})e^{j\theta_{k-1,2}}, (x_{k,1} + jy_k)e^{j\theta_{k,1}}, (x_{k,2} + jy_k)e^{j\theta_{k,2}}, (x_{k+1,1} + jy_{k+1})e^{j\theta_{k+1,1}}, (x_{k+1,2} - jy_{k+1})e^{j\theta_{k+1,2}}, \ldots \quad (1)$$

where $\theta_{k,1}$ and $\theta_{k,2}$ represent shifts of the carrier signal in the first and second time slots of the $k$-th clock interval. It is to be noted here that the train of sampled values comprises consecutive units, each consisting of replicas of transmission signal components successively derived at the transmitting end from a single sampled value of the input signal in accordance with the first and second signal map portions, such as those exemplified in FIGS. 1A and 1B, and that each unit may be termed a "block." Block synchronism must now be initially attained on the receiving side.

Referring to FIG. 3, a demodulator responsive to an input signal modulated at a transmitting end in compliance with the signal mapping according to this invention and received at a receiving end depicted for producing a demodulated signal includes an input terminal 41 for the input, an output terminal 42 for the demodulated signal, a full-wave rectifier 43 for rectifying the input signal, a tuning filter 44 responsive to the full-wave rectified input signal for producing local timing pulses of a repetition period equal to ½ of the clock interval T used in the transmitting end, a phase adjuster 45 for adjusting a predetermined amount the phase of the timing pulse to produce sampling or phase adjusted timing pulses, a voltage controlled oscillator 46 for generating a local carrier signal, a phase shifter 47 for shifting the phase of the local carrier signal by $\pi/2$, a synchronous detector 50 responsive to a cosine and a sine local carrier signal supplied from the oscillator 46 and shifter 47 and to the input signal for producing in phase and quadrature phase base band components of the input signal, a first and a second sampler 51 and 52 responsive to the sampling pulses for sampling the in phase and quadrature phase components, and a combining circuit 55 for combining the sampled base band components to supply the combined signal to the output terminal 42 as the demodulated signal. The detector 50 comprises a first and second ring modulator 56 and 57 responsive to the cosine and sine local carrier signals for modulating the input signal and low-pass filters 58 and 59 for extracting the base band components from the modulated signals. It is possible to convert the sampled signals to digital signals and thereby to use digital circuits in the subsequent stages of the demodulator. Inasmuch as the sampling pulses are in substantial synchronism with the time slots of the clock intervals of the input signal, the in phase and quadrature phase base band components are mathematically given by Sequence (1).

Further referring to FIG. 3, the demodulator comprises delay circuits 61 and 62 for delaying the in phase and quadrature phase base band components by ½ of the clock interval T, and correlation circuit 65 for deriving a correlation signal representative of the correlation between the undelayed and delayed base band components, and a block synchronizing pulse generator 66 responsive to the sampling pulses and to the correlation signal for producing block synchronizing pulses of a repetition period equal to the clock interval T. It is worthwhile to note that the block synchronism is readily achieved at a receiving end with the circuitry mentioned here when use is made of a modulator according to this invention at a transmitting end. More particularly, the correlation circuit 65 normally derives that correlation between the first sample of a $k$-th block and the conjugate complex number of the second sample of the $k$-th block which is given by $$E\{(x_{k,1} + jy_k)e^{j\theta_{k,1}} \cdot (x_{k,2} + jy_k)e^{-j\theta_{k,2}}\} \qquad (2)$$

where E represents the expectation of the product enclosed with the braces. It is practical to presume that $$E\{x_{k,1}x_{k,2}\} = 0, \ E\{x_{k,1}y_k\} = E\{y_k x_{k,2}\} = 0, \qquad (3)$$

and $$\theta_{k,1} - \theta_{k,2} = 0,$$

when Expectation (2) becomes equal to $-\{E\ y_k^2\}$. When the block synchronism goes into disorder, the correlation circuit 65 derives that correlation between the second sample of the next preceding $(k-1)$-th block and the conjugate complex number of the first sample of the $k$-th block which is given by $$E\{(x_{k-1,2} - jy_{k-1})e^{j\theta_{k-1,2}} \cdot (x_{k,1} - jy_k)e^{-j\theta_{k,1}}\}. \qquad (4)$$

and which is equal to zero under Presumption (3). The block synchronizing pulse generator 66 therefore comprises a sampler 67 for sampling the products given in the braces in Expectation (2) or (4) at the individual clock intervals, an integrator 68 for integrating the sampled expectations, a discriminator 69 responsive to a reference or threshold level retained therein for producing a suppression pulse each time the integrated signal is less than the reference level, and a variable or controlled frequency divider 70 which, in this case, is responsive to the suppression pulses to suppress the sampling pulses in order to produce block synchronizing pulses in synchronism with the clock intervals of the input signal. The synchronizing pulses are supplied to the sampler 67. Incidentally, the correlation circuit 65 comprises a first multiplier 71 for deriving the products of the undelayed and delayed inphase base band components, a second multiplier 72 for deriving the products of the undelayed quadrature phase base band components and those delayed quadrature phase band components which are polarity inverted by an inverter 73, and an adder 74 for summing up the products derived by the multipliers 71 and 72 to produce the correlation signal.

Referring still further to FIG. 3, the demodulator further comprises a carrier phase control circuit 75 responsive to the block synchronizing pulses and to the undelayed and delayed in phase and quadrature phase base band components for deriving a control signal to be supplied to the voltage controlled oscillator 46 to control the phase of the local carrier signal. In this connection, it should be pointed out that it is possible after achievement of the block synchronism to derive correct combinations of the first and second samples of the successive blocks. The phase control circuit 75 therefore may comprise a first adder 76 for the undelayed and delayed inphase base band components, a second adder 77 for the undelayed and delayed quadrature phase base band components, and a multiplier 78 for successively deriving the products of the sums derived by the first and second adders 76 and 77. In a $k$-th clock interval, the adders 76 and 77 products sum signals representative in combination of a sum $$(x_{k,1} + jy_k)e^{j\theta_{k,1}} \cdot + (x_{k,2} - jy_k)e^{j\theta_{k,2}} \cdot$$

which is equal to $$(x_{k,1} + x_{k,2})e^{j\theta_{k,1}} \cdot \qquad (5)$$

in view of the last or third relation $\theta_{k,1} - \theta_{k,2} = 0$ given in presumption (3). The multiplier 78 derives the product $$[(x_{k,1} + x_{k,2})^2 \sin 2\theta_{k,1}]/2$$

of the real and imaginary parts of Formula (5). It is thus feasible to produce the control signal by sampling the product by a sampler 79 to which the block synchronizing pulses are supplied. Incidentially, the block synchronizing pulses are supplied also to the combining circuit 53 to insure the block synchronism of the demodulated signal.

What is claimed is:

1. A demodulator for demodulating a received quadrature amplitude modulated signal supplied from a modulator and having a predetermined clock interval wherein the signal being transmitted is separated into a most significant portion and at least significant portion respectively modulating an in phase carrier during first and second halves of a clock period and wherein a quantization error value and its complement respectively modulate a quadrature phase carrier during the first and second halves of the same clock period, said demodulator comprising;

a local carrier generator for generating a local carrier signal;

a synchronous detector responsive to said local carrier signal for deriving in phase and quadrature phase base band components from said received signal;

means responsive to said received signal for deriving timing pulses of a repetition period equal to one half of said clock interval;

a first sampler responsive to said timing pulses for producing samples of said in phase base band component;

a second sampler responsive to said timing pulses for producing samples of said quadrature phase base band components;

first delay means for delaying the in phase component samples by said repetition period;

second delay means for delaying the quadrature phase component samples by said repetition period;

a correlation circuit means coupled to the outputs of said first and second delay means and said first and second samplers and responsive to the undelayed and delayed in phase and quadrature phase component samples for producing an output signal representative of the sums of the correlation between the delayed and undelayed in phase component samples of adjacent clock intervals and the correlation between the delayed and undelayed quadrature phase component samples of adjacent clock intervals;

a synchronizing pulse generator means responsive to said timing pulses and said correlation circuit output signal for producing synchronizing pulses appearing in synchronism with and at the same repetition rate as the clock intervals of said received signal; and a phase control circuit means responsive to said synchronizing pulses and said undelayed and delayed in phase and quadrature phase, component samples for producing a control signal, said control signal being supplied to said local carrier generator to adjust the phase of said local carrier signal relative to the received signal.

2. A demodulator as claimed in claim 1, wherein said synchronizing pulse generator comprises a sampler for sampling said correlation signal with a sampling period equal to said clock interval, an integrator responsive to the sampled correlation signal for producing a sampled and integrated correlation signal, a discriminator responsive to a reference level for producing a suppression pulse each time said integrated correlation signal becomes less than said reference level, and a controlled frequency divider responsive to said timing pulse and the suppression pulses for producing said synchronizing pulses, said synchronizing pulses being supplied to said correlation signal sampler to define said sampling period.

3. A demodulator as claimed in claim 2, wherein said correlation circuit comprises an inverter responsive to said delayed quadrature phase component samples for producing inverted quadrature phase component samples, a first multiplier responsive to said undelayed and delayed in phase component samples for producing a first product signal, a second multiplier responsive to said undelayed and inverted quadrature phase component samples for producing a second product signal, and an adder responsive to said first and second product signals for producing said correlation signal.

4. A demodulator as claimed in claim 2, wherein said phase control circuit comprises a first adder responsive to said undelayed and delayed in phase component samples for producing a first sum signal, a second adder responsive to said undelayed and delayed quadrature phase component samples for producing a second sum signal, a multiplier responsive to said first and second sum signals for producing a product signal, and a sampler responsive to said synchronizing pulses and said product signal for producing said control signal.

* * * * *